Sept. 1, 1970        J. MALINA ET AL        3,526,890

LINEAR TAPE TRANSDUCER

Filed Aug. 8, 1968        3 Sheets-Sheet 1

INVENTOR.
ROBERT B. WALDER
JAY MALINA
BY Meyer A. Baskin
ATTORNEY.

INVENTOR.
ROBERT B. WALDER
JAY MALINA
BY Meyer A. Baskin
ATTORNEY.

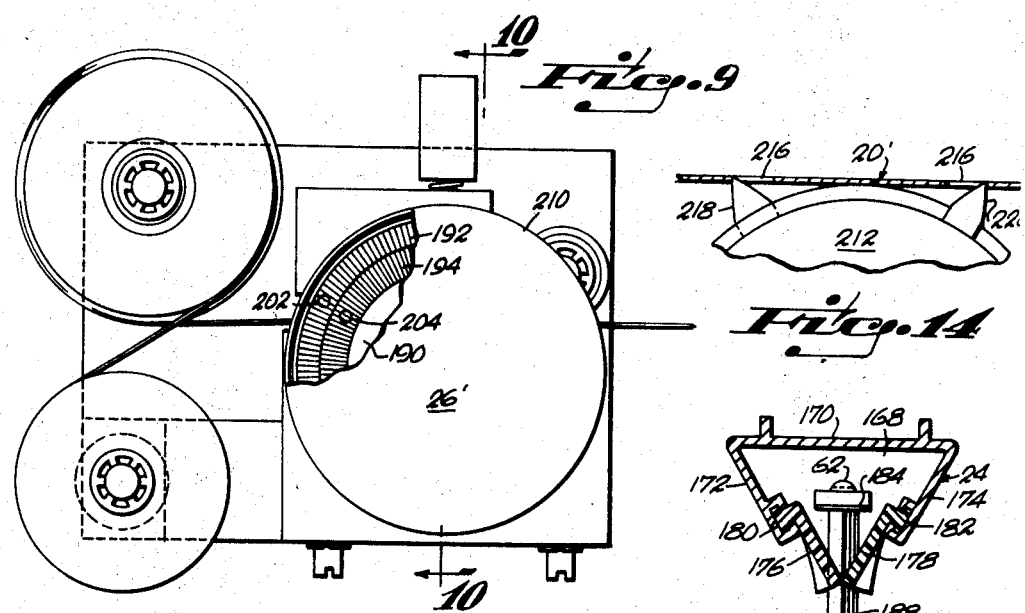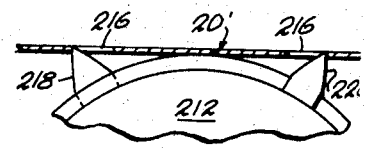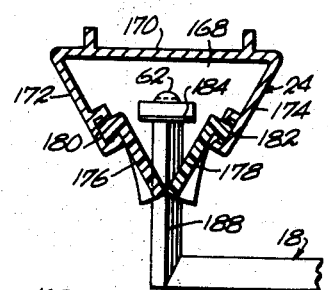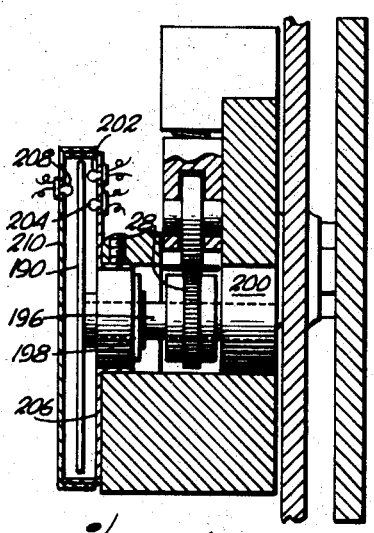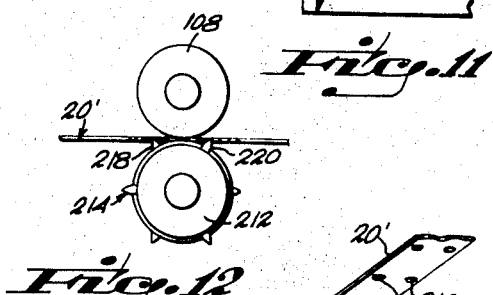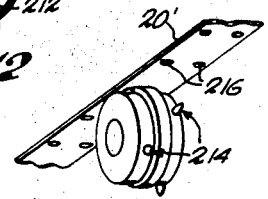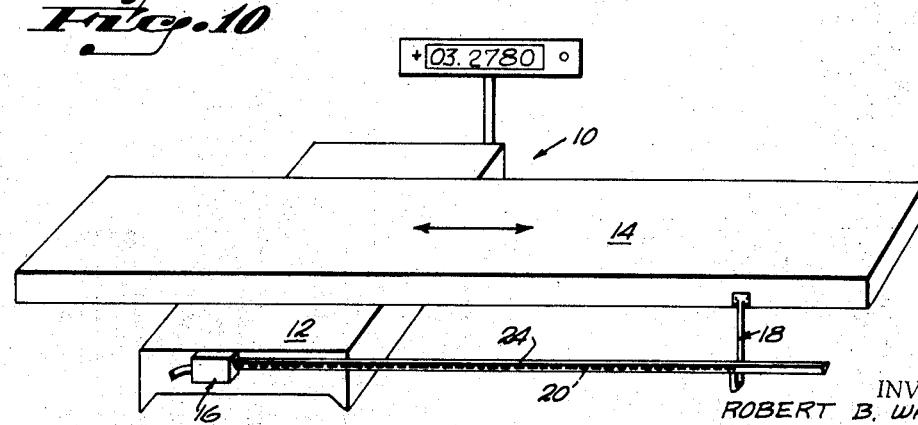

United States Patent Office 3,526,890
Patented Sept. 1, 1970

3,526,890
LINEAR TAPE TRANSDUCER
Jay Malina and Robert B. Walder, Miami Beach, Fla., assignors to Anilam Electronics Corporation, Hialeah, Fla., a corporation of Florida
Filed Aug. 8, 1968, Ser. No. 751,201
Int. Cl. H03k 13/00
U.S. Cl. 340—347                                   8 Claims

ABSTRACT OF THE DISCLOSURE

This invention pertains to a high precision mechanical measuring device to be used in an electronic measuring system for machine tools, referred to in the trade as a digital readout system. The device consists generally of a housing enclosing a retractable measuring tape and precision guide means to prevent any distortion of the tape as it passes therethrough. The outer end of the tape extends through an opening in one end of the housing, which is fixed to a stationary part of a machine tool, and is in turn fixed to a movable part thereof such as a table or carriage, the axis of the extended portion of the tape being in substantial alignment with its axis through the guide means. The mechanical movement of the carriage or table, having the end of the tape fixed thereto, relative to the stationary housing, is converted into electric pulses which are converted into numbers illuminated on a display unit for the operator to see.

---

This invention pertains to a linear tape transducer to be used in combination with an electronic digital readout system for machine tools.

One of the principal problems with machine tools in the past, when a very high degree of accuracy was necessary, resided in the fact that machine tool operators had tedious calculations to make and dials to set with the result that, in average cases, the setup and measuring time averaged close to 45 percent of the entire job process. However, even with this tedious process other factors such as wear and leadscrew backlash often interfered with the desired accuracy.

With the electronic measuring system, the setup time is reduced as much as 80–90%, however, as the accuracy of the system is dependent on a retractable, thin steel measuring tape, it is necessary to prevent any distortion of said tape and to provide a constant tension thereon throughout its entire length during the unwinding and rewinding thereof.

One of the principal objects of the present invention, therefore, is to provide a linear tape transducer which is extremely accurate and maintains its accuracy during an extended period of use.

Another object is to provide a thin steel measuring tape convolutely wound about a spool within a housing fixed to a stationary part of a machine tool with one end of the steel tape extending outwardly through an opening in one end thereof, and being fixed to a movable part of the machine tool to measure the movement thereof relative to the stationary part of the machine tool, with means to convert the mechanical movement of the tape into electric pulses which are converted into numbers illuminated on a display unit.

A further object of the instant invention is to provide a spring convolutely wound about a second spool with its inner end fixed thereto and having its outer end fixed to a portion of the measuring tape spool to be convolutely wound thereabout during the unwinding of the measuring tape. Said spring being of a type known in the trade as a negator spring which provides a constant tension on the measuring tape spool throughout its entire length during the unwinding and rewinding thereof. When the measuring tape is unwound to any extent, the negator spring is proportionately wound on the measuring tape spool adjacent the tape, storing a constant amount of energy in said spring throughout its length.

A still further object of this invention is to provide guide means mounted in a body casting in the housing to guide the measuring tape on a straight line and in a constant plane.

A further object is to provide a series of guide rollers on axes parallel to the top and bottom surfaces of the measuring tape to maintain the tape in a constant plane and a second series of adjustable rollers on axes perpendicular to the top and bottom surfaces of the tape, positioned to contact the side edges of said tape to keep it on a straight line in said plane.

Yet another object of this invention is to provide a measuring roller in surface contact with the bottom of the measuring tape intermediate the guide rollers and a spring urged idler roller in surface contact with the top of the tape in alignment with said measuring roller to maintain a constant pressure on the measuring roller through the tape to provide a constant driving engagement between the tape and the measuring roller. The measuring roller is fixed to a shaft which transmits the tape movement to a device generally known as a pulse generator which sends electric pulses to the electronic device which in turn converts the pulses into numerals illuminated on a display unit.

A still further object of this invention is to provide mounting means for the second set of rollers, which contact the side edges of the tape for lineal control, which include adjustable eccentric means to provide the proper guiding contact with said edges.

Another object of this invention is to provide equally spaced apertures adjacent each side edge of the steel measuring tape along its entire length and cooperating tapered pins spaced and positioned about the circumferential surface of the measuring roller to engage through the holes of the tape as it passes between said measuring roller and idler to further insure against slippage of said measuring roller relative to the measuring tape.

A still further object of the instant invention is to provide a protective rail member for the measuring tape extending from the housing to a point just beyond the fully extended position of said tape.

Other objects and advantages of this invention will become more fully apparent from the following detailed description thereof when read in conjunction with the accompanying drawings in which:

FIG. 9 is a front elevational view similar to FIG. 1, illustrating a somewhat modified form of the invention;

FIG. 10 is a vertical cross sectional view taken along the line 10—10 of FIG. 9 and looking in the direction of the arrows;

FIG. 11 is a vertical cross sectional view of the protective rail, taken along the line 11—11 of FIG. 4 and looking in the direction of the arrows;

FIG. 12 is an elevational view of a modified form of measuring roller and steel measuring tape;

FIG. 13 is a perspective view of the roller and tape of FIG. 12;

FIG. 14 is an enlarged fragmentary portion of FIG. 12;

FIG. 15 is a schematic illustration of a machine tool incorporating the linear tape transducer of the present invention.

Figure 1:
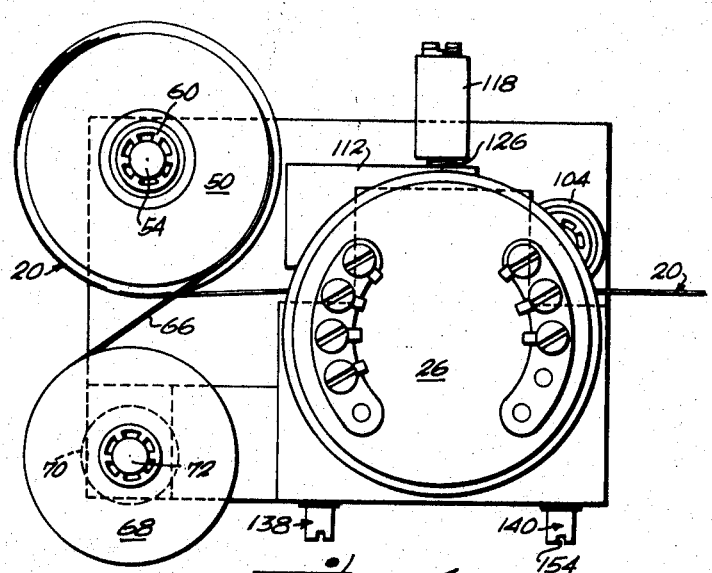
FIG. 1 is a front elevational view of the lineal tape transducer in accordance with the instant invention and removed from the housing.
Figure 6:
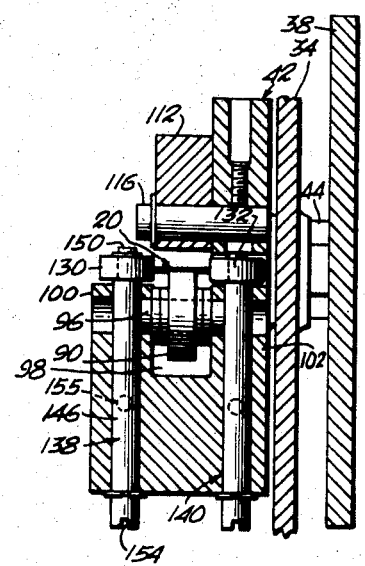
FIG. 6 is a vertical cross sectional view taken along the line 6—6 of FIG. 4 and looking in the direction of the arrows.
Figure 2:
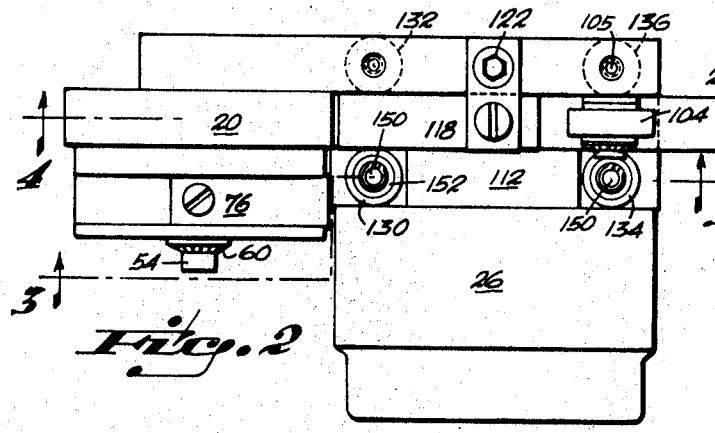
FIG. 2 is a top plan view of FIG. 1.

Referring to the drawings in which like reference numerals designate like or similar parts throughout the various views, the numeral 10 generally designates a schematic illustration of a machine tool in FIG. 15 having a stationary portion 12 and a portion 14 movable relative thereto. A linear tape transducer indicated generally at 16 is fixed to the stationary portion 12 and a finger 18 extending generally downward from the movable portion 14 is fixed to the end of a steel measuring tape 20, extending outwardly from the linear tape transducer 16, to withdraw the tape or to allow it to retract in accordance with the amount and direction of movement thereof. A display unit, indicated generally at 22 indicates the amount and direction of movement and may be located at any convenient location on a stationary portion of the machine. Preferably, the extended portion of the measuring tape is protectively housed in a rail 24 as will be subsequently described.

While the electronic digital readout system forms no part of the present invention, it is important to note that this device records measurements to one ten-thousandths of an inch and the accuracy of this recording is dependent on the accuracy of the linear tape transducer from which it receives signals in the form of electric pulses transmitted thereto from a pulse generator 26, FIGS. 1, 2, 7 and 8, which in turn transmits its signals in direct incremental proportion to the amount and direction of tape movement, which movement is imparted to the pulse generator 26, by a measuring roller 28 in rolling contact with one longitudinal face 30 of the tape.

Figure 5:
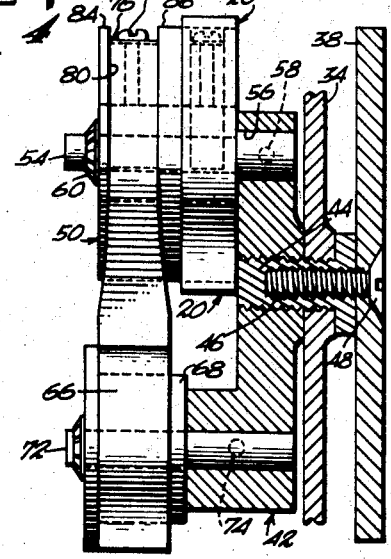
FIG. 5 is a vertical cross sectional view taken along the line 5—5 of FIG. 4 and looking in the direction of the arrows.
Figure 3:
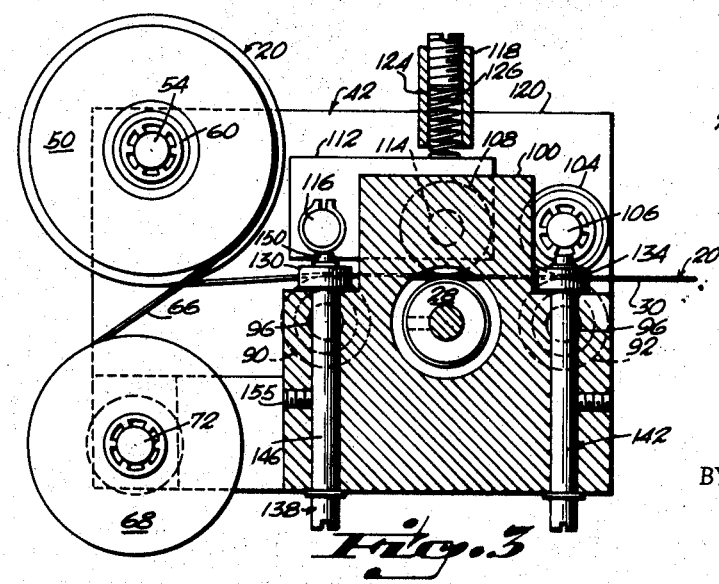
FIG. 3 is a longitudinal, vertical sectional view taken along the line 3—3 of FIG. 2 and looking in the direction of the arrows.

The linear tape transducer of the present invention is enclosed in a housing 32, composed of two portions 34 and 36, the portion 34 being fixed to any appropriate bracket 38 which is in turn fixed to a stationary portion of a machine tool. The portion 36 is bolted to the portion 34 to enclose the transducer and is provided with an electric conduit opening 39 at one end and an opening 40 at the other end for passage therethrough of the extended portion of the steel measuring tape 20. A main body casting 42 is fixed interior of housing portion 34 by a plurality of screws 44 threaded therethrough as best seen in FIG. 5. The screws 44 are interiorly screw threaded as at 46 to receive screws 48 threaded through the attaching bracket 38. It is to be noted that the interior screw threaded recesses do not extend through the screws 44.

The body casting 42 carries a spool 50 journaled as at 52 on a stub shaft 54 fixed in an appropriate aperture 56 in the casting by means of a set screw 58, spool 50 being held on the shaft 54 by a spring washer 60. Referring to FIGS. 1, 3, 4 and 5, it is seen that the steel measuring tape is convolutely wound around the inter portion of the spool, coming off of the spool at the bottom in FIG. 4 and passing between sets of vertical and horizontal guide rollers indicated generally at 61, then extending outwardly through the opening 40 and having its outer end fixed as at 62 to an upstanding portion 64 of the finger 18.

A spring 66 is convolutely wound about a second spool 68, journaled as at 70 on a stub shaft 72 fixed in the body casting 42 by means of a set screw 74. This spool 68 is spaced from the tape spool 50 and the spring 66 is of a type known in the trade as a negator spring which exerts a constant tension regardless of the extent to which it is unwound, in contrast to the ordinary convolutely wound tension spring which exerts a constantly decreasing tension as it is being unwound. The end 76 of the negator spring 66 is fixed to the steel measuring tape spool 50 in a manner to be unwound from the spool 68 and wound convolutely on the spool 50 as the measuring tape 20 is being unwound and to exert a constant tension on the spool 50, tending to rewind the steel tape. Consequently, the steel measuring tape is under a constant tension at all times, regardless of the amount of tape that is unwound from the spool 50.

A novel method of attaching the end 76 of the spring 66 and the inner end of the steel measuring tape to the spool 50 is employed. As they are both attached in the same manner, the following description applies to both. The attached ends such as 76 of the spring are of a reduced width to lie in an arcuate recess 80 of the same reduced width in the annular face of the spool and are fixed therein by screws 82. The recesses are formed on a radius approximately equal to or greater than the radius of the spool 50 and the width of the spring and tape increase as they emerge from the recesses so that the convolutions of each lies against the shoulders 84 and 86 on each side of the recesses. By forming the recesses on a large radius, no bulge or kink is formed in the tape or spring as it emerges from the recesses to cause changes in length thereof under constant usage.

Another important feature of the present invention resides in the sets of guide rollers 61 which guide the tape over the measuring roller 28 in a consistent plane of travel in a straight line. A pair of guide rollers 90 and 92 spaced outwardly from the measuring roller 28 in opposed directions are journaled on appropriate bearings 94 on shafts 96 spanning a central recess 98 in the casting body 42 and are fired in the wall portions 100 and 102 of said casting. The guide rollers 90 and 92 and the measuring roller 28 are all in contact with the bottom longitudinal surface of the steel measuring tape on a common tangent. A companionate guide roller 104 nearly contacts the top longitudinal surface of the tape in opposed relation to roller 92 and is appropriately journaled on a stub shaft 106 fixed in the casting wall 102 by means of a set screw 105. No companionate roller is necessary for the roller 94 as the annular face of the spool 50 lies substantially on the common tangent of rollers 90, 92 and 28.

A spring urged idler roller 108 contacts the top longitudinal face of the tape 20 in opposed relation to the measuring roller 28 to insure driving contact between the tape and roller 28. The roller is journaled in a recess 110 in a block 112 on a pin 114 and the block is pivotally connected at 116 to the casting 42. A block 118 is fixed to the top edge 120 of the casting 42 by means of a screw 122 and is provided with a bore 124 housing a compression spring 126 having its outer end nesting in a companionate bore 128 in the top of block 112 to urge the idler roller 108 toward the measuring roller 28. The peripheral surface of the measuring roller is cross dressed to further insure a good driving contact.

Additionally, two pairs of guide rollers are provided to guide the steel measuring tape in a straight line in its plane of travel between the measuring roller 28 and the idler 108, one pair 130 and 132 are provided in opposed relation with their peripheral surfaces in guiding contact with the opposed side edges of the measuring tape. The side edge guide rollers 130 and 132 are positioned substantially in a common vertical plane with the guide roller 94 in a spaced relation on one side of the measuring roller. On the opposed side of said measuring roller and in substantially a common vertical plane with guide rollers 92 and 94 are a second pair of guide rollers 134 and 136 serving the same function in the same manner as the rollers 130 and 132.

Each of the four guide rollers 130 to 136 is adjustably mounted in the same manner on two pairs of eccentric shafts 138 and 140, and 142 and 144. Each eccentric shaft comprises an elongate body portion 146 mounted in an appropriate vertical aperture in the body casting 42 and is held in plate by a split ring 148 adjacent its lower end. The upper end of each shaft is provided with a reduced diameter portion 150 which is eccentric relative to the elongate body portion 146 and carries the side guide rollers journaled thereon by appropriate bearings 152. Each shaft is provided with a screw driver slot 154 at its lower end for adjusting the rollers 130 to 136 on the eccentric portion 150 for proper guiding contact with the edges of the measuring tape. A set screw 155 is also provided for each eccentric shaft to hold it in its proper adjusted position. Appropriate cut out apertures 156 and 158 are provided in the main mounting member 42 for the two side edge guide rollers 132 and 136.

Figure 4:
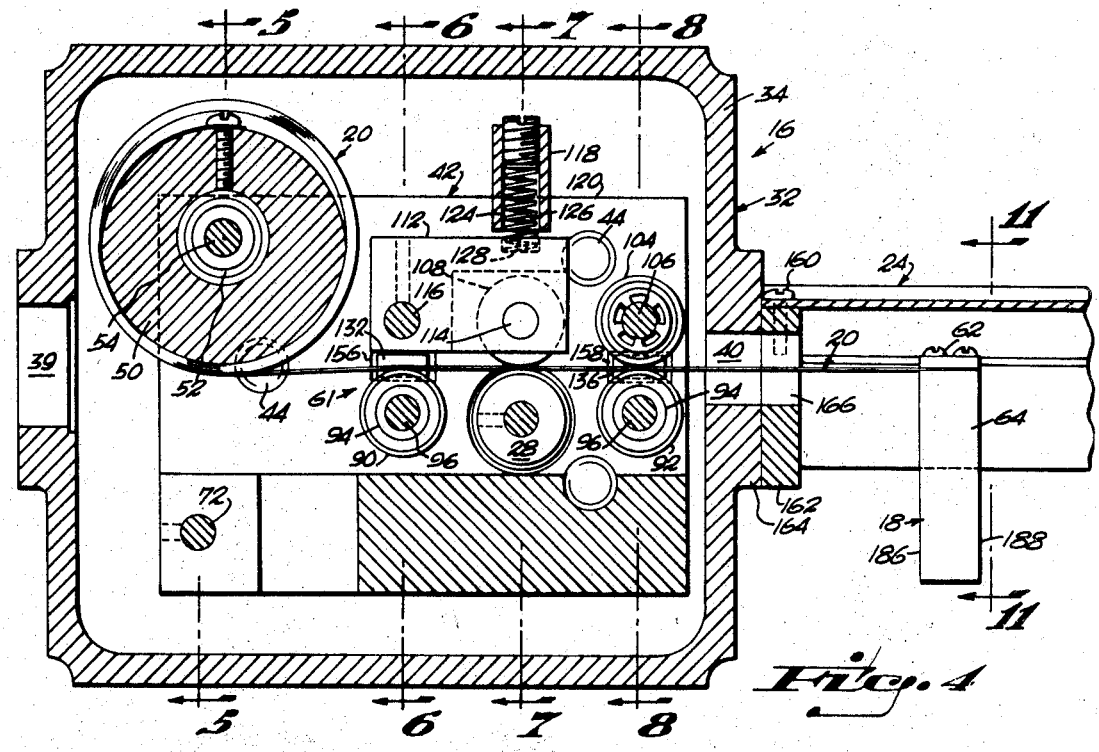
FIG. 4 is a longitudinal, vertical sectional view taken along the line 4—4 of FIG. 2 and looking in the direction of the arrows.
Figures 7, 8:
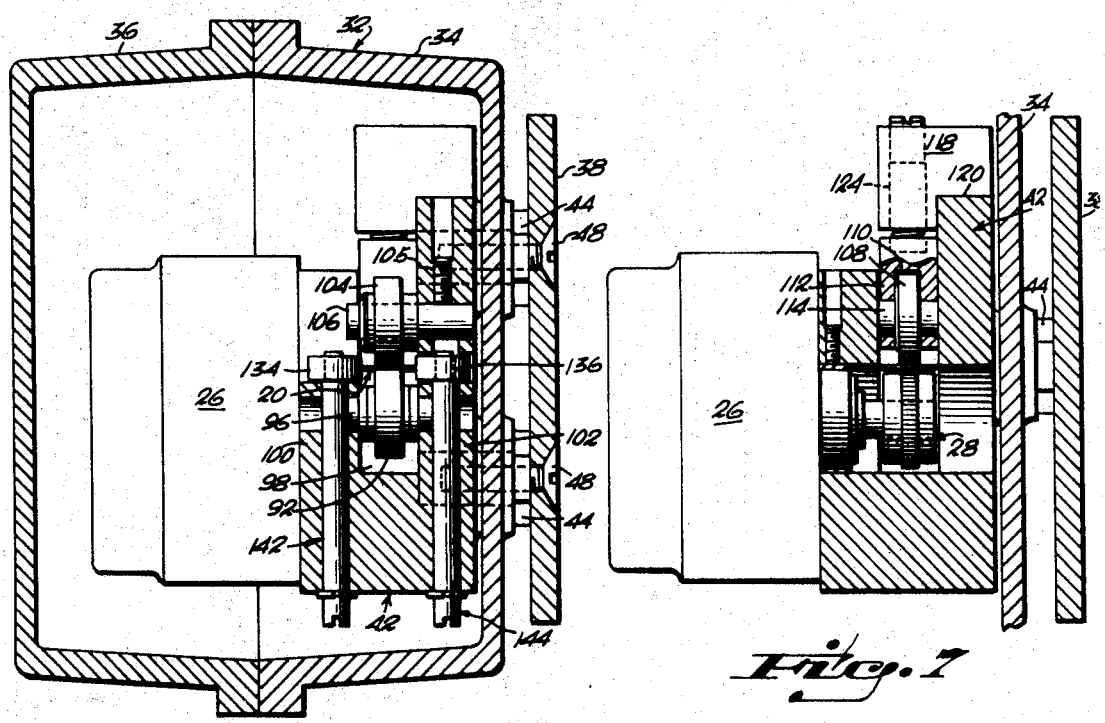
FIG. 7 is a vertical cross sectional view taken along the line 7—7 of FIG. 4 and looking in the direction of the arrows.
FIG. 8 is a vertical cross sectional view taken along the line 8—8 of FIG. 4 and looking in the direction of the arrows.

Referring now to FIGS. 4 and 11, the steel measuring tape housing rail 24 is illustrated which is generally of an inverted pyramid form in cross section. The rail is fixed by screws 160 to an adapter 162 which is in turn fixed to a boss 164 of the housing 16 and is provided with a through opening 166 in registry with the opening 40 in said housing for thru passage of the steel measuring tape. The outer end of the rail is fixed to the machine tool in any appropriate manner (not shown). As best illustrated in FIG. 11, the rail provides an interior chamber 168 for protectively housing the measuring tape 20 throughout its length of travel exterior of the linear tape transducer housing 32. The rail 24 includes a roof portion 170 and a pair of downwardly conveying side walls 172 and 174 carrying a pair of similarly converging flexible lip portions, 176 and 178 appropriately keyed in T slots 180 and 182. It is to be noted that the flexible lip portions form a line of contact at their bottom edges to prevent dust, chips, etc. from entering the interior chamber 168.

The upstanding portion 64 of the finger 18 passes upwardly between the lips 176 and 178 and enters the chamber 168 to carry the end 184 in a fixed relation thereto as at 62. The portion 64 may include feathered leading and trailing edges 186 and 188 to provide as small an opening as possible between the lips 180 and 182 on both sides of the penetration of the lips.

FIGS. 9 and 10 illustrate a modified form of the present invention in so far as the pulse generator 26 is concerned. In this instance, it comprises a disc 190 having two annular rows of staggered markings 192 and 194 thereon, adjacent its outer periphery. The disc 190 is fixed to a shaft 196 journaled in appropriate bearings 198 and 200 and includes a measuring roller 28 fixed to the shaft therebetween, in operative contact with the steel measuring tape, in the same manner as previously described. A pair of photoelectric cells 202 and 204 are fixed in a housing 206 in scanning relation to the annular rows of staggered markings 192 and 194 respectively, and a light source 208 is fixed in a housing cover 210 on the opposed side of the disc.

When the measuring tape 20 is traveled in either direction between the measuring roller 28' and the idler 108', the movement is transmitted from the measuring roller to the disc and the photoelectric cells 202 and 204 transmit pulses to the electronic digital readout system and the pulses are converted thereby into plus or minus counts on the display unit, depending upon the direction of travel of said measuring tape.

The pulse generator 26 of the first form of the invention described, performs this same function in the same manner but is a commercially available unit.

A modified form of measuring roller 212 is illustrated in FIGS. 12, 13 and 14 which includes two sets of spaced locating pins 214 in a staggered relation adjacent the two peripheral edges thereof. Cooperating apertures 216 are provided along the entire length of the measuring tape 20'. To provide for flexibility in installation the apertures 216 are provided in opposed pairs adjacent each peripheral edge of the tape. In use, every other aperture will register with a locating pin 214.

Referring to FIGS. 12 and 14 it is apparent that each locating pin is arcuately tapered in such a manner that the trailing edge 218 of each pin enters its cooperating aperture in contact with the trailing edge thereof, and rides up into the aperture in contact therewith upon continued clockwise movement of the measuring roller 212 until it assumes a vertical attitude, in which position it fills the aperture. Continued clockwise movement of the roller 212 causes the locating pin 214 to withdraw from the aperture 216 with the leading edge 220 thereof in continuous contact with the leading edge of the aperture until it is completely withdrawn. The locating pins 214 are spaced in such a manner that one pin is entering its cooperating aperture as another pin is withdrawing from its cooperating aperture in the manner just described. Consequently, a confined movement exists between the tape 20' and the measuring roller 212 to insure equal relative movement therebetween.

While the present invention has been illustrated and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus and articles.

We claim:

1. For use in accurately measuring the amount of movement of a movable part of a machine tool relative to a stationary part thereof, an electronic measuring system for machine tools which converts electric pulses into numbers illuminated on a display unit for the operator to see; the improvement residing in: a linear tape transducer means to sense and convert said mechanical movement of said movable part into said electric pulses comprising;

(A) a main body portion mounted to said stationary portion of the machine tool, (B) a steel measuring tape convolutely wound about a first spool rotatably journaled on said main body portion and having,
  (a) its inner end fixed to said first spool and
  (b) its outer end extended to a position of attachment to said movable portion, to move therewith in the direction and amount of travel thereof, (C) a constant tension spring convolutely wound about a second spool, spaced from said first spool and rotatably journaled on said main body portion and having,
  (a) its inner end fixed to said first spool and
  (b) its outer end extended to a position of attachmanner to be withdrawn from said second spool, and convolutely wound about said first spool when said movable portion is traveled in a first direction away from said first spool to withdraw said measuring tape therefrom, said spring exerting tension on said first spool to rewind said measuring tape thereon when said movable portion is traveled in a second direction toward said first spool, the tension exerted on said first spool by said constant tension spring remaining constant at all times;

(D) a first guide means within said main body portion adjacent said spools to support said steel measuring tape throughout a predetermined span and to guide it in a constant plane of travel therethrough as it is being withdrawn from and retracted on said first spool;

(E) a second guide means within said main body portion, co-positioned with said first guide means, to maintain said steel measuring tape in a straight path of travel in said constant plane;

(F) a measuring roller, intermediate said span of said first and second guide means, in rolling contact with a first main surface of said steel measuring tape to be rotated in a direction and amount in accord with the movement of the measuring tape;

(G) an electric pulse generator means operably fixed to said measuring roller to generate electric pulses in direct proportion to the amount of travel of said movable portion and to transmit said pulses to said electronic measuring system to accurately and visibly record the precise amount and the direction of travel of said measuring tape as it moves in its path of travel through said first and second guide means;

(H) said steel measuring tape includes the first and a second main surfaces and said first guide means comprises three planar guide rollers journaled on axes parallel to said first and second main surfaces, two of said planar guide rollers being spaced apart to define said span and constant plane of travel and having a substantially common plane of tangency with said first spool and receiving said steel measuring tape thereover from said first spool, said third planar guide roller being positioned in opposed relation to one of said two planar guide rollers with said steel measuring tape passing therebetween.

2. A linear tape transducer as in claim 1 in which said main body portion including said first and second spools and first and second guide means are enclosed in a main housing having a first opening at one end for passage therethrough of electric conduit means and a second opening in the opposed end for passage therethrough of said steel measuring tape.

3. A linear tape transducer as in claim 1 in which said steel measuring tape includes a reduced width inner end portion and said spring includes a reduced width outer end portion for respective attachment in a pair of companionate width arcuate recesses in the outer peripheral face of said first spool, said recesses being arcuately formed therein on radii substantially equal to the radius of said first spool.

4. A linear tape transducer as in claim 1 in which said second guide means comprises two spaced apart pairs of side edge guide rollers journaled on axes perpendicular to said first and second main surfaces of said steel measuring tape, the rollers of each pair being positioned in an opposed relationship to contact the opposed side edges of said tape to maintain the steel measuring tape in said straight path of travel, said two pairs of side edge guide rollers being co-positioned relative to the span of said two planar guide rollers.

5. A linear tape transducer as in claim 4 in which each of said side edge guide rollers is journaled on an eccentric portion of a shaft carried in said main body portion, said shaft being rotatable to adjust said side edge guide rollers on said cam portions into a proper guiding relation with a side edge of said steel measuring tape and including means to lock said shaft in a set position.

6. A linear tape transducer as in claim 1 including a spring urged roller in contact with the second main surface of said measuring tape in opposed relation to said measuring roller, said spring including a compression adjusting means.

7. A linear tape transducer as in claim 1 in which said measuring roller includes two sets of spaced locating pins thereabout in a staggered relation adjacent the peripheral edges thereof, and said steel measuring tape includes two rows of cooperating apertures for engagement with said pins along the entire length thereof adjacent its respective peripheral edges, said pins being spaced and tapered in such a manner that upon relative movement of said measuring tape and roller, the trailing edge of each pin will enter a cooperating aperture in contact with the trailing edge thereof and ride up into the aperture in contact therewith until it assumes a vertical attitude relative to said measuring tape, in which position it fills the aperture, and upon continued relative movement of said measuring roller and tape the locating pin withdraws from said aperture with its leading edge in continuous contact with the leading edge of said aperture until it is completely withdrawn, the pins and apertures being spaced so that one pin is centering a cooperating aperture as another pin is withdrawing from its cooperating aperture to insure equal relative movement between said measuring tape and roller.

8. A linear tape transducer as in claim 1 in which said electric pulse generator comprises a disc having two annular rows of staggered radially extending equally spaced markings adjacent its outer periphery, two photo electric cells positioned on one side of said disc relative to said annular rows respectively, and a light source on the opposed side of said disc, said markings, photo electric cells and light source cooperating to transmit said pulses to said electronic measuring system.

References Cited

UNITED STATES PATENTS

| 2,876,549 | 3/1959 | Adamson | 33—129 |
| 3,024,986 | 3/1962 | Strinese | 340—347 |
| 3,043,962 | 7/1962 | Jones | 340—347 |
| 3,111,660 | 11/1963 | Stupar | 340—347 |
| 3,122,735 | 2/1964 | Townsend | 340—347 |
| 3,271,564 | 9/1966 | Rosenfeld | 340—347 |
| 3,024,990 | 3/1962 | Magnuson | 340—347 |

OTHER REFERENCES

The Hunter Negator and Other Spring Device, Hunter Spring Bulletin, 310–67, copyright 1966.

MAYNARD R. WILBUR, Primary Examiner

J. GLASSMAN, Assistant Examiner

U.S. Cl. X.R.

33—125, 129, 141